United States Patent [19]
Tokuda et al.

[11] Patent Number: 5,243,686
[45] Date of Patent: Sep. 7, 1993

[54] MULTI-STAGE LINEAR PREDICTIVE ANALYSIS METHOD FOR FEATURE EXTRACTION FROM ACOUSTIC SIGNALS

[75] Inventors: Kiyohito Tokuda; Atsushi Fukasawa; Satoru Shimizu; Yumi Takizawa, all of Tokyo, Japan

[73] Assignee: Oki Electric Industry Co., Ltd., Tokyo, Japan

[21] Appl. No.: 870,883

[22] Filed: Apr. 20, 1992

Related U.S. Application Data

[62] Division of Ser. No. 447,667, Dec. 8, 1989, Pat. No. 5,142,581.

[30] Foreign Application Priority Data

Dec. 9, 1988 [JP] Japan .................. 63-310205

[51] Int. Cl.$^5$ .............................. G10L 9/02
[52] U.S. Cl. ............................ 395/2
[58] Field of Search ............... 381/31–43; 395/2; 73/645, 646

[56] References Cited

U.S. PATENT DOCUMENTS

| | | | |
|---|---|---|---|
| 4,075,671 | 2/1978 | Davis et al. | 364/200 |
| 4,538,224 | 8/1985 | Peterson | 364/200 |
| 4,604,683 | 8/1986 | Russ et al. | 364/200 |
| 4,875,154 | 10/1989 | Mitchell | 364/206 |

Primary Examiner—Michael R. Fleming
Assistant Examiner—Michelle Doerrler
Attorney, Agent, or Firm—Edward D. Manzo

[57] ABSTRACT

Features are extracted from a sampled input signal by performing first linear predictive analyses of different first orders p on the sample values and performing second linear predictive analyses of different second orders q on the residuals of the first analyses. An optimum first order $\bar{p}$ is selected using information entropy values representing the information content of the residuals of the second linear predictive analyses. One or more optimum second orders $\bar{q}$ are selected on the basis of changes in these information entropy values. The optimum first and second orders are output as features. Further linear predictive analyses can be carried out to obtain higher-order features. Useful features are obtained even for nonstationary input signals.

39 Claims, 7 Drawing Sheets

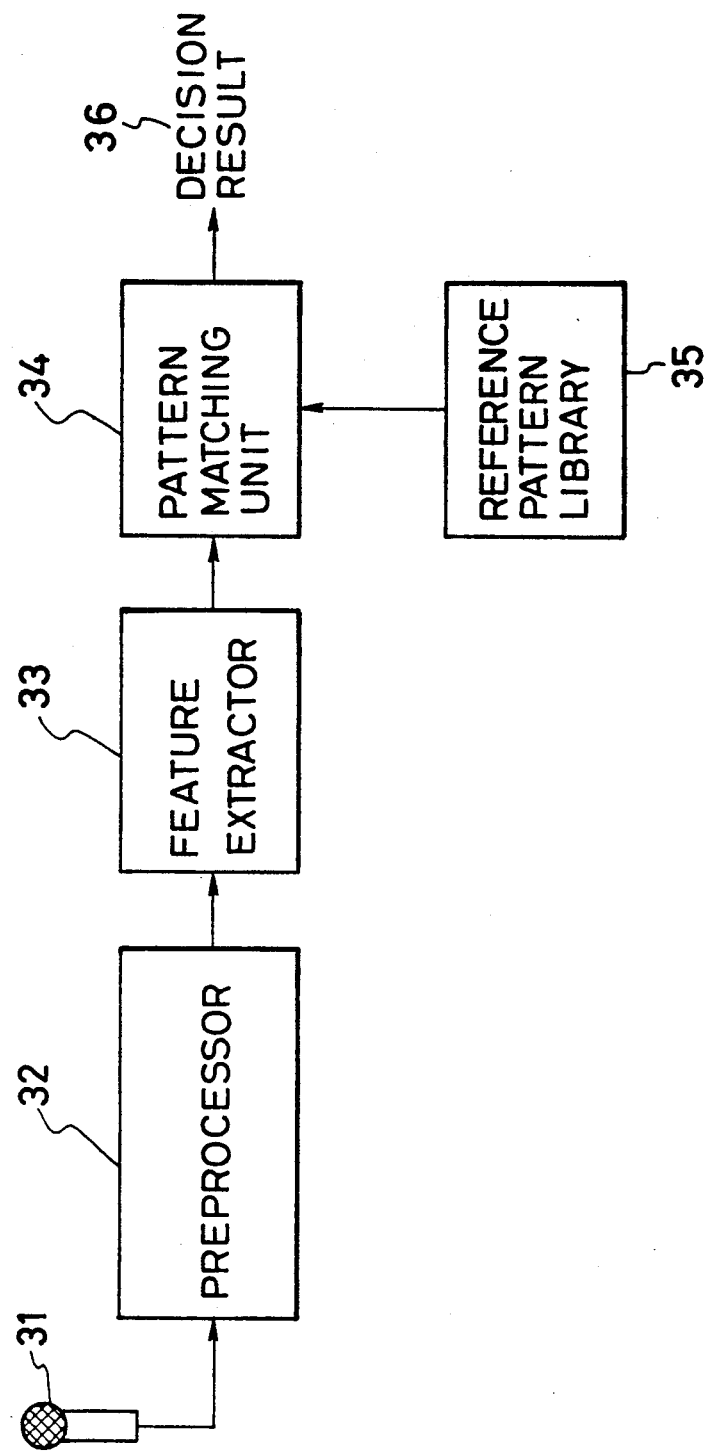

MULTI-STAGE LINEAR PREDICTIVE ANALYSIS METHOD FOR FEATURE EXTRACTION FROM ACOUSTIC SIGNALS

This is a divisional application of co-pending application Ser. No. 07/447,667 filed on Dec. 8, 1989 now U.S. Pat. No. 5,142,581 issued Aug. 25, 1992.

BACKGROUND OF THE INVENTION

This invention relates to a method of extracting features from an input signal by linear predictive analysis.

Feature extraction methods are used to analyze acoustic signals for purposes ranging from speech recognition to the diagnosis of malfunctioning motors and engines. The acoustic signal is converted to an electrical input signal that is sampled, digitized, and divided into fixed-length frames of short duration. Each frame thus consists of N sample values $x_1, x_2, \ldots, x_N$. The sample values are mathematically analyzed to extract numerical quantities, called features, which characterize the frame. The features are provided as raw material to a higher-level process. In a speech recognition or engine diagnosis system, for example, the features may be compared with a standard library of features to identify phonemes of speech, or sounds symptomatic of specific engine problems.

One group of mathematical techniques used for feature extraction can be represented by linear predictive analysis (LPA). Linear predictive analysis uses a model which assumes that each sample value can be predicted from the preceding p sample values by an equation of the form:

$$x_n = -(a_1 x_{n-1} + a_2 x_{n-2} + \ldots + a_p x_{n-p})$$

The integer p is referred to as the order of the model. The analysis consists in finding the set of coefficients $a_1, a_2, \ldots, a_p$ that gives the best predictions over the entire frame. These coefficients are output as features of the frame. Other techniques in this general group include PARCOR (partial correlation) analysis, zero-crossing count analysis, energy analysis, and autocorrelation function analysis.

Another general group of techniques employs the order p of the above model as a feature. Models of increasing order are tested until a model that satisfies some criterion is found, and its order p is output as a feature of the frame. The models are generally tested using the maximum-likelihood estimator $\sigma_p^2$ of their mean square residual error $\sigma_p^2$, also called the residual power or error power. Specific testing criteria that have been proposed include:

(1) Final predictive error (FPE)

$$FPE(p) = \hat{\sigma}_p^2 (N+P+1)/(N-P-1)$$

(2) Akaike information criterion (AIC)

$$AIC(p) = \ln(\hat{\sigma}_p^2) + 2(p+1)/N$$

(3) Criterion autoregressive transfer function (CAT)

$$CAT(p) = \left( \left[ (1/N) \sum_{j=1}^{p} (1/\tilde{\sigma}_j^2) \right] - 1/\tilde{\sigma}_p^2 \right)$$

where, $\tilde{\sigma}_j^2 = [N/(N-j)]\hat{\sigma}_p^2$

The order p founs as a feature is related to the number of peaks in the power spectrum of the input signal.

A problem of all of these methods is that they do not provide useful feature information about short-duration input signals. The methods in the first group which use linear predictive coefficients, PARCOR coefficients, and the autocorrelation function require a stationary input signal: a signal long enough to exhibit constant properties over time. Short input signal frames are regarded as nonstationary random data and correct features are not derived. The zero-crossing counter and energy methods have large statistical variances and do not yield satisfactory features.

In the second group of methods, there is a tendency for the order p to become larger than necessary, reflecting spurious peaks. The reason is that the prior-art methods are based on logarithm-average maximum-likelihood estimation techniques which assume the existence of a precise value to which the estimate can converge. In actual input signals there is no assurance that such a value exists. In the AIC formula, for example, the accuracy of the estimate is severely degraded because the second term, which is proportional to the order, is too large in relation to the first term, which corresponds to the likelihood.

SUMMARY OF THE INVENTION

It is accordingly an object of the present invention to extract features from both stationary and nonstationary input signals.

Another object is to provide multiple-order characterization of the input signal.

A feature extraction method for extracting features from an input signal comprises steps of sampling the input signal to obtain a series of sample values, performing first linear predictive analyses of different first orders p on the sample values to generate residuals, performing second linear predictive analyses of different second orders q on these residuals to generate an information entropy value for each second order q, and outputting as features an optimum first order $\bar{p}$ and one or more optimum second orders $\bar{q}$. The optimum first order $\bar{p}$ is the first order p at which the information entropy value exceeds a first threshold. The optimum second orders $\bar{q}$ are those values of the second order q at which the change in the information entropy value exceeds a second threshold.

The method can be extended by generating further residuals in the second linear predictive analyses and performing third linear predictive analyses of different orders on these further residuals. In this case a single optimum second order $\bar{q}$ can be determined, and one or more third optimum orders $\bar{r}$ are also output as features. The method can be extended in analogous fashion to higher orders.

A feature extractor comprises a sampling means for sampling an input signal to obtain a series of sample values, and two or more stages connected in series. The first stage performs linear predictive analyses of different orders on the sample values, generates residuals, and selects an optimum order on the basis of information entropy values received from the next stage. Each intermediate stage performs linear predictive analyses of different orders on residuals received from the preceding stage, generates residuals and information entropy values, and selects an optimum order on the basis of information entropy values received from the next stage. The last stage performs linear predictive analyses of different orders on residuals received from the preceding stage, generates information entropy values, and selects one or more optimum orders on the basis of changes in these information entropy values. All selected optimum orders are output as features.

BRIEF DESCRIPTION OF THE DRAWINGS

FIG. 7 is a block diagram illustrating an application of the invention.

DETAILED DESCRIPTION OF THE INVENTION

A novel feature extraction method and feature extractor will be described with reference to the drawings.

Figure 1:
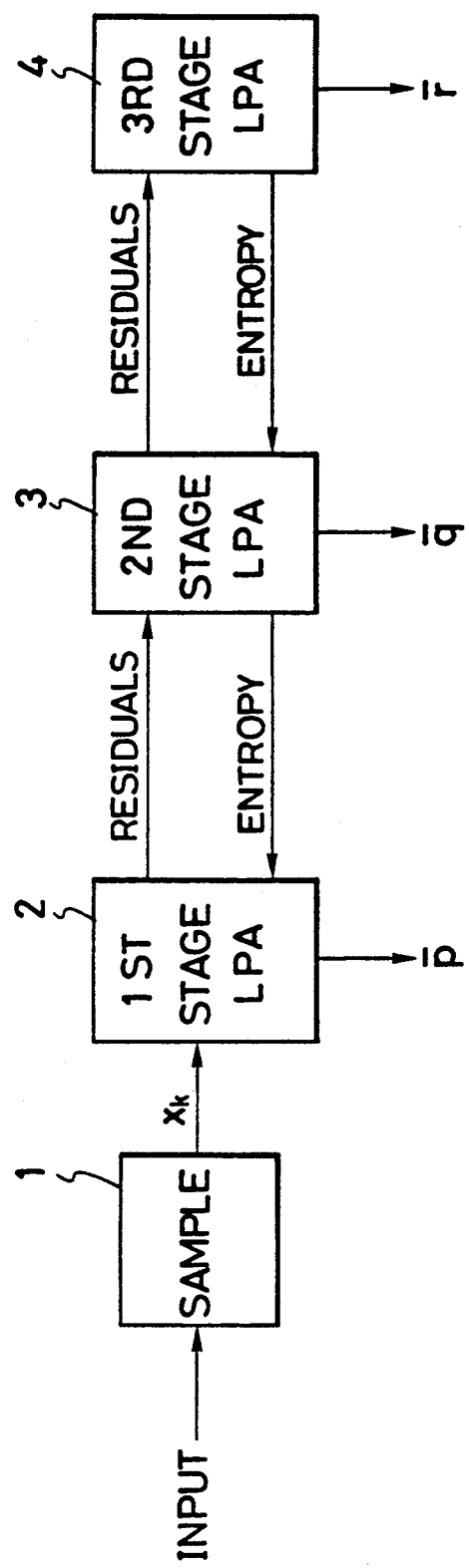
FIG. 1 is a block diagram illustrating the general plan of the invention.

FIG. 1 is a block diagram illustrating the general plan of the novel feature extractor. An input signal such as an acoustic signal which has been converted to an analog electrical signal is provided to a sampling means 1. The sampling means 1 samples the input signal to obtain a series of sample values $x_n$. The sampling process includes an analog-to-digital conversion process, so that the sample values $x_n$ are output as digital values. The output sample values are grouped into frames of N samples each, where N is preferably a power of two. The succeeding discussion will deal with a frame of sample values $x_1, x_2, \ldots, x_N$.

Feature extraction is performed in a sequence of two or more stages, which are connected in series. In FIG. 1 three stages are shown in order to illustrate first, intermediate, and last stages.

The first stage 2 receives the sample values from the sampling means 1 and performs linear predictive analyses of different orders p on them, thus generating residuals which represent the difference between predicted and actual sample values. The first stage 2 also receives information entropy values from the second stage 3, on the basis of which it selects an optimum order $\bar{p}$ for output as a feature.

The second stage 3, which is an intermediate stage in FIG. 1, receives the residuals generated in the first stage 2 and performs linear predictive analyses of different orders q on them, thus generating further residuals. For each order q, the second stage 3 also generates an information entropy value representing the information content of the residuals generated by the corresponding linear predictive analysis. The second stage 3 receives similar information entropy values from the third stage 4, on the basis of which it selects an optimum order $\bar{q}$ for output as a feature.

The third stage 4, which is the last stage in FIG. 1, receives the residual values generated in the second stage 3 and performs linear predictive analyses of different orders r on them. For each order r, the third stage 4 generates an information entropy value representing the information content of the corresponding residuals, but does not generate the residuals themselves. On the basis of changes in these information entropy values, the third stage 4 selects one or more optimum orders $\bar{r}$ for output as features.

Next a more detailed description of the structure of the feature extractor stages and feature extraction method will be given. For simplicity, only two stages will be shown, a first stage and a last stage. In feature extractors with intermediate stages, the intermediate stages comprise an obvious combination of structures found in the first and last stages.

Figure 2:
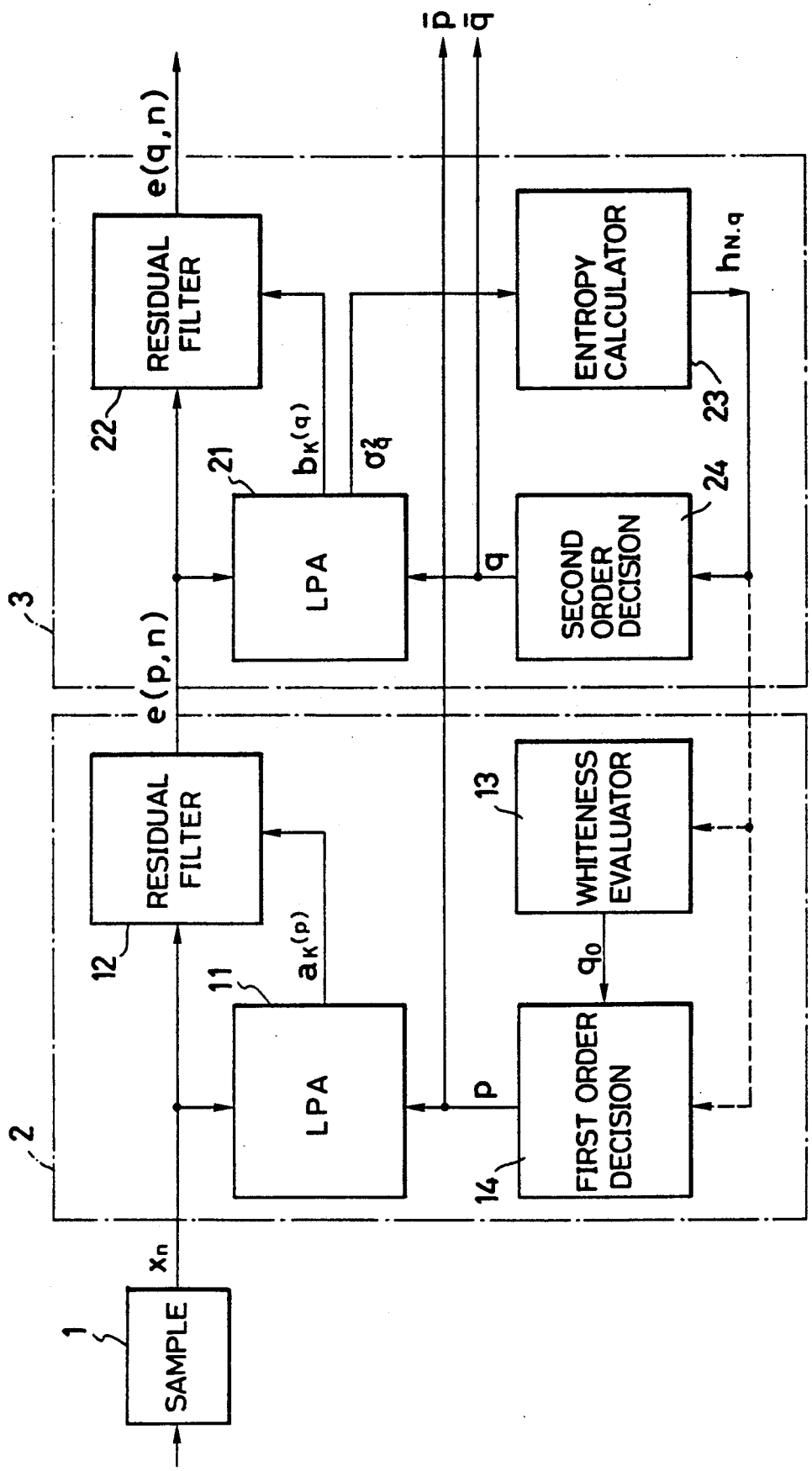
FIG. 2 is a block diagram illustrating an embodiment of the invention having two stages.

With reference to FIG. 2, the first stage 2 comprises a first linear predictive analyzer 11 that receives the sample values $x_1, \ldots, x_N$ from the sampling means 1, receives a first order p from a first order decision means to be described later, and calculates a set of linear predictive coefficients $a_1, \ldots, a_p$. As a notational convenience, to indicate that these coefficients belong to a specific order p, a superscript (p) will be added and the coefficients will be written as $a_k^{(p)}$ (k=1, 2, ..., p). The linear predictive coefficients $a_k^{(p)}$ are selected so as to minimize first residuals e(p, n) (n=p+1, p+2, ... N), which are defined as follows:

$$e(p, n) = x_n + a_1^{(p)} x_{n-1} + a_2^{(p)} x_{n-2} + \cdots + a_p^{(p)} x_{n-p}$$

More specifically, the linear predictive coefficients are selected so as to minimize the sum of the squares of the residuals, which will be referred to as the residual power and denoted $\sigma_p^2$. The residual power $\sigma_p^2$ is representative of the mean square error of the first linear prediction analysis; the mean square error could be calculated by dividing the residual power by the number of residuals.

The first linear predictive analyzer 11 provides the coefficients $a_k^{(p)}$ to a residual filter 12, which also receives the sample values $x_1, \ldots, x_N$ from the sampling means 1 and calculates the values of the residuals e(p, n). The residuals e(p, n) are provided to the second stage 3.

The first stage 2 also comprises a whiteness evaluator 13 for receiving information entropy values $h_{N,q}$ from the second stage 3 and mutually comparing them to find a whitening order $q_0$ beyond which the information entropy values $h_{N,q}$ decrease at a substantially constant rate. The whitening order $q_0$ can be interpreted as the order beyond which the residuals produced in the second stage have the characteristics of white noise.

The whiteness evaluator 13 provides the whitening order $q_0$ to a first order decision means 14, which also receives the corresponding information entropy value from the second stage 3. The first order decision means 14 stores and increments the first order p, and provides the first order p to the first linear predictive analyzer 11, thus causing it to perform linear predictive analyses of different first orders p, the initial order being p=1. The first order decision means 14 also tests whether the information entropy value corresponding to the whitening order $q_0$ exceeds a certain first threshold. If it does, the current first order p is considered an optimum order, correctly reflecting the number of first-order peaks in the power spectrum of the input signal. The first order decision means 14 then stops incrementing p and outputs this optimum first order, denoted $\bar{p}$, as a feature.

The second stage 3 comprises a second linear predictive analyzer 21 for receiving the residual values e(p, n) from the first stage 2 and a second order value q from a second order decision means to be described later, and performing a second linear predictive analysis of order q on the received residual values. The second linear predictive analysis is similar to the first linear predictive analysis performed in the first stage 2. The second linear predictive analyzer 21 calculates and outputs a residual power $\sigma_q^2$ representative of the mean square error in the second linear predictive analysis. If there is a third stage, the second linear predictive analyzer 21 also outputs a set of linear predictive coefficients $b_k^{(q)}$ to a second residual filter 22.

The second residual filter 22, which need be provided only if there is a third stage, receives the residuals e(p, n) from the first stage 2 and the linear predictive coefficients $b_k^{(q)}$ from the second linear predictive analyzer 21, and calculates a new series of residuals e(q, n) as follows:

$$e(q, n) = e(p, n) + b_1^{(q)} e(p, n-1) + \ldots + b_q^{(q)} e(p, n-q)$$

The residuals e(q, n) need to be output to the third stage, if present, only when the optimum first order $\bar{p}$ has been determined. The second and third stages can then analyze the residuals e($\bar{p}$, n) of the optimum first order $\bar{p}$ in the same way that the first and second stages analyzed the sample values $x_1, \ldots, x_N$.

The second stage 3 also comprises an entropy calculator 23 for receiving the residual power $\sigma_q^2$ from the second linear predictive analyzer 21 and calculating an information entropy value $h_{N,q}$. Details of the calculation will be shown later. The entropy calculator 23 provides the information entropy value $h_{N,q}$ to the first stage 2 as already described.

The entropy calculator 23 also provides the information entropy value $h_{N,q}$ to a second order decision means 24. The second order decision means 24 stores and increments the second order q and provides it to the second linear predictive analyzer 21, causing the second linear predictive analyzer 21 to perform second linear predictive analyses of different orders q. The second order should start at q=1 and proceed up to a certain maximum value such as q=100, preferably in steps of one. The second order decision means 24 also stores the information entropy values $h_{N,q}$ received from the entropy calculator 23 for different values of q, compares them, and selects as optimum those values of the second order q at which the change in the information entropy value $h_{N,q}$ exceeds a certain second threshold. This method of selecting optimum second orders q is used when, as in FIG. 2, no information entropy values are received from a higher stage. The optimum second orders q, collectively denoted $\bar{q}$, are output as features.

The first and second stages can be assembled from standard hardware such as microprocessors, floating-point coprocessors, digital signal processors, and semiconductor memory devices. Alternatively, special-purpose hardware can be used. As another alternative, the entire feature extraction process can be implemented in software running on a general-purpose computer.

Next the theory of operation and specific computational procedures will be described.

The novel feature extraction method assumes that the input signal $x_n$ can be described by an autoregressive model of some order p:

$$x_n = - \sum_{k=1}^{p} a_k x_{n-k} + e_n \quad (1)$$

in which the $e_n$ are a Gaussian white-noise series, i.e. a series of Gaussian random variables satisfying the following conditions:

$$E[e_n] = 0$$

$$E[e_n \cdot e_j] = E[e_n \cdot x_{n-j}] = \sigma_p^2 \delta_{nj}$$

where $\delta_{nj}$ is the Kronecker delta symbol, the value of which is one when j=n and zero when j≠n. The coefficients $a_k^{(p)}$ (k=1, 2, ..., p) are calculated from the well-known Yule-Walker equations:

$$r_j + \sum_{k=1}^{p} a_k r_{j-k} = 0 \quad (j \geq 1)$$

$$r_0 + \sum_{k=1}^{p} a_k r_k = \sigma_p^2$$

$$r_j = E[x_n \cdot x_{n-j}] \quad (2)$$

The operator E[ ] conventionally denotes expectation, but in this invention it is given the computationally simpler meaning of summation. In equation (2), for example, $E[x_n \cdot x_{n-j}]$ denotes the sum of all products of the form $x_n \cdot x_{n-j}$ as n varies from 1 to N.

In the first linear predictive analyzer 11, the Yule-Walker equations are solved using the well-known Levinson-Durbin algorithm. This algorithm is recursive in nature, the coefficients $a_k^{(p)}$ being derived from the coefficients $a_k^{(p-1)}$ by the formulas:

$$a_k^{(p)} = a_{k-1}^{(p-1)} + \gamma_{A,p} a_{p-k}^{(p-1)}$$

(k=1, 2, ... p−1)

$$a_p^{(p)} = \gamma_{A,p} \quad (3)$$

The p-th autocorrelation coefficient $r_p$ is calculated as follows:

$$r_p = - \sum_{k=1}^{p-1} r_{p-k} a_k^{(p-1)} - \gamma_{A,p} \cdot \sigma_{p-1}^2 \quad (p \geq 1) \quad (4)$$

$$r_0 = \sum_{n=1}^{N} x_n^2 \quad (5)$$

The quantities $\gamma_{A,p}$, which are referred to as average reflection coefficients, can be calculated, for example by the maximum entropy method. A residual filter of order p is described by the following equation on the z-plane:

$$A_p(z^{-1}) = 1 + (a_1^{(p-1)} + \gamma_p a_{p-1}^{(p-1)}) z^{-1} + \ldots$$

$$+ (a_{p-1}^{(p-1)} + \gamma_p a_1^{(p-1)}) z^{-(p-1)} + \gamma_p z^{-p} \quad (6)$$

The average reflection coefficients are determined so as to minimize the mean square of the residual when a stationary input signal is filtered by this residual filter. Writing $x_m(1)$ for $x_m$, $x_m(2)$ for $x_{m+1}$, and so on, consider N−p series of sample values, each consisting of p+1 values:

$$\{x_m(1), x_m(2), \ldots, x_m(p+1)\}, m=1, 2, \ldots, N-p$$

The mean square value $I_1$ of the residual when these series are filtered in the forward direction is:

$$I_1 = \sum_{m=1}^{N-p} |\gamma_p x_m(1) + (a_{p-1}^{(p-1)} + {}_p a_1^{(p-1)})x_m(2) + \ldots + \tag{7}$$

$$(a_1^{(p-1)} + {}_p a_{p-1}^{(p-1)})x_m(p) + x_m(p+1)|$$

$$= \sum_{m=1}^{N-p} |\gamma_p(x_m(1) + a^{(p-1)}x_m(2) + \ldots +$$

$$a_{p-1}^{(p-1)}x_p(N)) + (a_p^{(p-1)}x_m(2) + \ldots +$$

$$a_1^{(p-1)}x_m(p) + x_m(p+1))|$$

Let the forward residual $f_{p,m}$ be defined as:

$$\begin{aligned}f_{p,m} = a_{p-1}^{(p-1)}x_m(2) + \ldots \\ + a_1^{(p-1)}x_m(p) + x_m(p+1)\end{aligned} \tag{8}$$

and the backward residual $b_{p,m}$ be defined as:

$$b_{p,m} = x_m(1) + a_1^{(p-1)}x_m(2) + \ldots + a_{p-1}^{(p-1)}x_m(p) \tag{9}$$

The mean square residual $I_1$ is then:

$$I_1 = \sum_{m=1}^{N-p} |f_{p,m} + \gamma_p \cdot b_{p,m}|^2 \tag{10}$$

If the input signal $x_k$ is known to be stationary, the mean square residual $I_2$ when it is filtered by the residual filter in the backward direction is:

$$I_2 = \sum_{m=1}^{N-1} |b_{p,m} + \gamma_p \cdot f_{p,m}|^2 = I_1 \tag{11}$$

If the signal is nonstationary, so that $I_2 \neq I_1$, the average $I_A = (I_1 + I_2)/2$ can be used. The p-th average reflection coefficient $_{A,p}$ must satisfy:

$$\delta I_A / \delta \gamma_{A,p} = 0$$

The solution is:

$$\gamma_{A,p} = -2 \sum_{m=1}^{N-p} f_{p,m} \cdot b_{p,m} / \sum_{m=1}^{N-p} (f_{p,m}^2 + b_{p,m}^2) \tag{12}$$

The linear predictive coefficients $a_k^{(p)}$ are calculated from the foregoing equations (3), (5), and (12) and sent to the residual filter 12.

The residual filter 12 convolves the N sample values $x_n$ with the linear predictive coefficients $a_k^{(p)}$ calculated by the first linear predictive analyzer 11 to obtain the residuals e(p, n). The computation is carried out using the following modified form of equation (1), and the result is sent to the second stage 3.

$$e(p, n) = x_n + \sum_{k=1}^{p} a_k x_{n-k} \tag{13}$$

In the second stage 3, the second linear predictive analyzer 21 carries out a similar linear predictive analysis on the residuals e(p, n) to compute linear predictive coefficients $b_k^{(q)}$. It also uses the average reflection coefficients $\gamma_{A,q}$ derived during the computation to calculate the residual powers $\sigma_q^2$ according to the following recursive formula:

$$\sigma_q^2 = \sigma_{q-1}^2(1 - \gamma_{A,q}^2) \tag{14}$$

The second residual filter 22 generates the residual values e(q, n), if required, by the same process as the first residual filter 12.

The entropy calculator 23 calculates the information entropy value for each order according to the residual power received from the second linear predictive analyzer 21. This calculation can be performed iteratively as described below.

Let $S_q(f)$ be the power spectrum of the residuals e(q, n) estimated by the second residual filter, and let $f_N$ be the Nyquist frequency, equal to half the sampling frequency. The entropy density $h_{d,q}$ is defined as:

$$h_{d,q} = \frac{1}{4f_N} \int_{-f_N}^{f_N} \ln S_q(f) df \tag{15}$$

$$= (1/2)\ln\sigma_q^2 - (1/2)\ln 2f_N$$

Equation (14) can be expressed as follows:

$$\sigma_q^2 = \sigma_0^2 \prod_{i=1}^{q} (1 - \gamma_{A,i}^2) \tag{16}$$

From equation (16), the entropy density $h_{d,q}$ is:

$$h_{d,q} = (1/2)\ln \prod_{i=1}^{q} (1 - \gamma_{A,i}^2) + (1/2)\ln(\sigma_0^2/2f_N) \tag{17}$$

The information entropy value $h_{N,q}$ is obtained from the entropy density $h_{d,q}$ by subtracting the constant term on the right, thereby normalizing the value according to the zero-order residual power $\sigma_0^2$.

$$\begin{aligned}h_{N,q} &= h_{d,q} - (1/2)\ln(\sigma_0^2/2f_N) \\ &= (1/2)\ln \prod_{i=1}^{q} (1 - \gamma_{A,i}^2)\end{aligned} \tag{18}$$

This value is sent to the whiteness evaluator 13, the first order decision means 14, and the second order decision means 24.

It will be apparent from equation (18) that instead of providing the residual powers $\sigma_q^2$ to the entropy calculator 23, the second linear predictive analyzer 21 can provide the average reflection coefficients $\gamma_{A,q}$.

The information entropy values $h_{N,q}$ are negative numbers that decrease with increasing values of q. In general, there will be an initial interval of abrupt decrease followed thereafter by a more gradual decrease at a substantially constant rate signifying white-noise residuals. The whiteness evaluator 13 mutually compares the information entropy values $h_{N,q}$ output by the entropy calculator 23 for different valves of q, finds an order beyond which no further abrupt drops in information entropy occur, and selects this order as the whitening order $q_0$. The whitening order $q_0$ is sent to the first order decision means 14 to be used in determining the optimum order $\bar{p}$ of the first linear predictive analyzer 11.

The first order decision means 14 receives the whitening order $q_0$ and the corresponding information entropy value, and tests this information entropy value to see whether it exceeds a first threshold. The first threshold, which should be selected in advance on an empirical basis, represents a saturation threshold of the whitened information entropy. If the corresponding entropy value does not exceed the first threshold, the first order decision means 14 increments p by one and the first predictive analysis is repeated with the new order p. The second linear predictive analyses are also repeated, for all second orders q. If the corresponding entropy value exceeds the first threshold, the first order decision means 14 halts the process and outputs the current first order as the optimum first order $\bar{p}$.

The optimum second orders output as features are selected on the basis of the residuals $e(\bar{p}, n)$ output by the first residual filter 12 at the optimum first order $\bar{p}$. Specifically, the second order decision means 24 calculates the change in information entropy $\Delta h_{N,q}$ between successive information entropy values:

$$\Delta h_{N,q} = h_{N,q} - h_{N,q-1}$$

The second order decision means 24 also calculates the mean $\overline{\Delta h_{N,q}}$ and standard deviation $\sigma_{h,q}$ of $\Delta h_{N,q}$. The mean $\overline{\Delta h_{N,q}}$ can conveniently be calculated as the difference between the first and last information entropy values divided by the number of information entropy values minus one. The second threshold is then set as the difference between the mean and standard deviation:

$$\text{Second threshold} = \overline{\Delta h_{N,q}} - \sigma_{h,q}$$

The second order decision means 24 selects as optimum second orders all those second orders q for which $\Delta h_{N,q}$ exceeds the second threshold. Since $\Delta h_{N,q}$ and the second threshold are both negative in sign, "exceeds" means in the negative direction. The criterion is:

$$h_{N,q} - h_{N,q-1} < \overline{\Delta h_{N,q}} - \sigma_{h,q}$$

When the input signal has known properties, the feature extraction process can be simplified by selecting a fixed whitening order $q_0$ in advance instead of calculating a separate whitening order $q_0$ for every first order p. The whiteness evaluator 13 can then be eliminated, and the number of second linear predictive analyses can be greatly reduced. Specifically, at first orders p less than the optimum order $\bar{p}$ the second linear predictive analyzer 21 only has to iterate the Levinson-Durbin algorithm $q_0$ times to determine the first $q_0$ average reflection coefficients, and the entropy calculator 23 only has to calculate the information entropy value corresponding to $q_0$. The full calculation for all second order values q only has to be performed once, at the optimum first order $\bar{p}$.

Next, the extraction of features by the novel method will be illustrated with reference to FIGS. 3 to 6.

Figure 3:
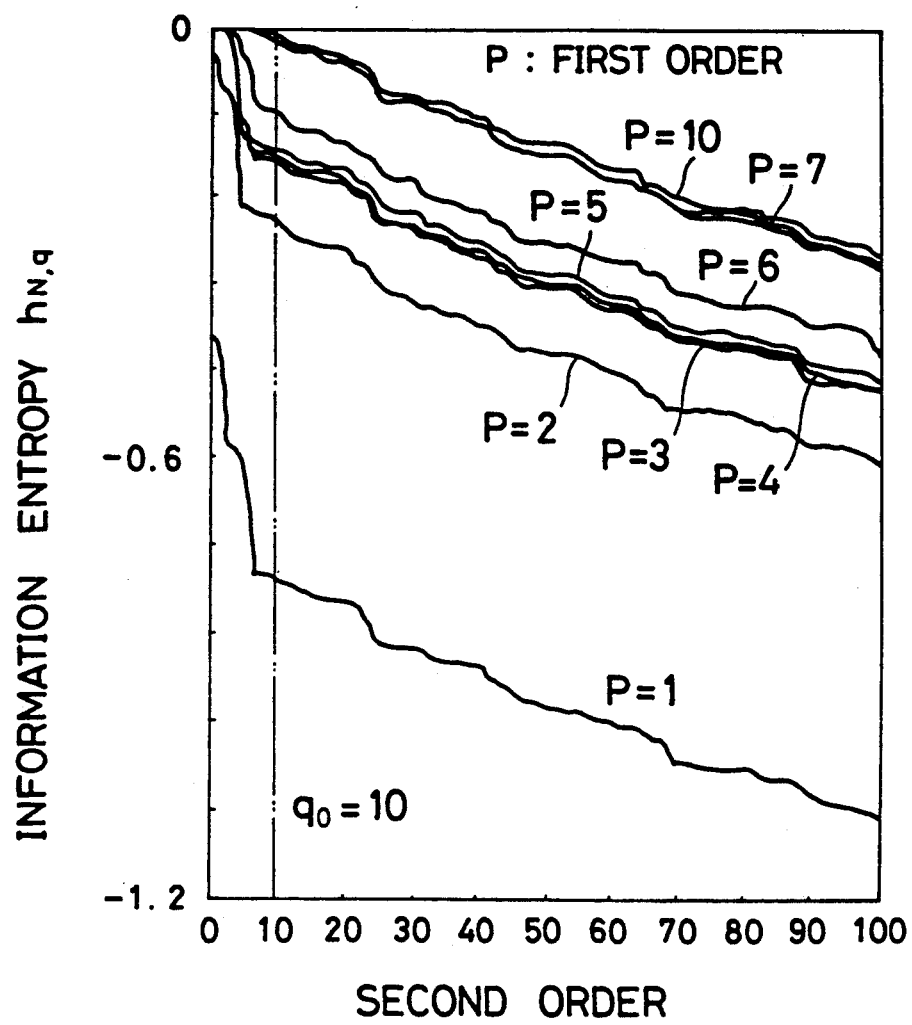
FIG. 3 illustrates whiteness evaluation.

FIG. 3 illustrates the evaluation of the whiteness of the second-order residuals. The second order q is shown on the horizontal axis, and the information entropy value $h_{N,q}$ on the vertical axis. As the first order p varies from one to ten, the information entropy curves gradually rise toward a saturation state. The curves generally comprise an initial abruptly-dropping part followed thereafter by a more gradual decrease at a substantially constant rate, as described earlier. For all values of p, the abrupt drop is confined to values of q less than ten. For input signals of the type exemplified in this drawing, the whitening order $q_0$ may preferably be fixed at a value such as $q_0 = 10$.

Figure 4:
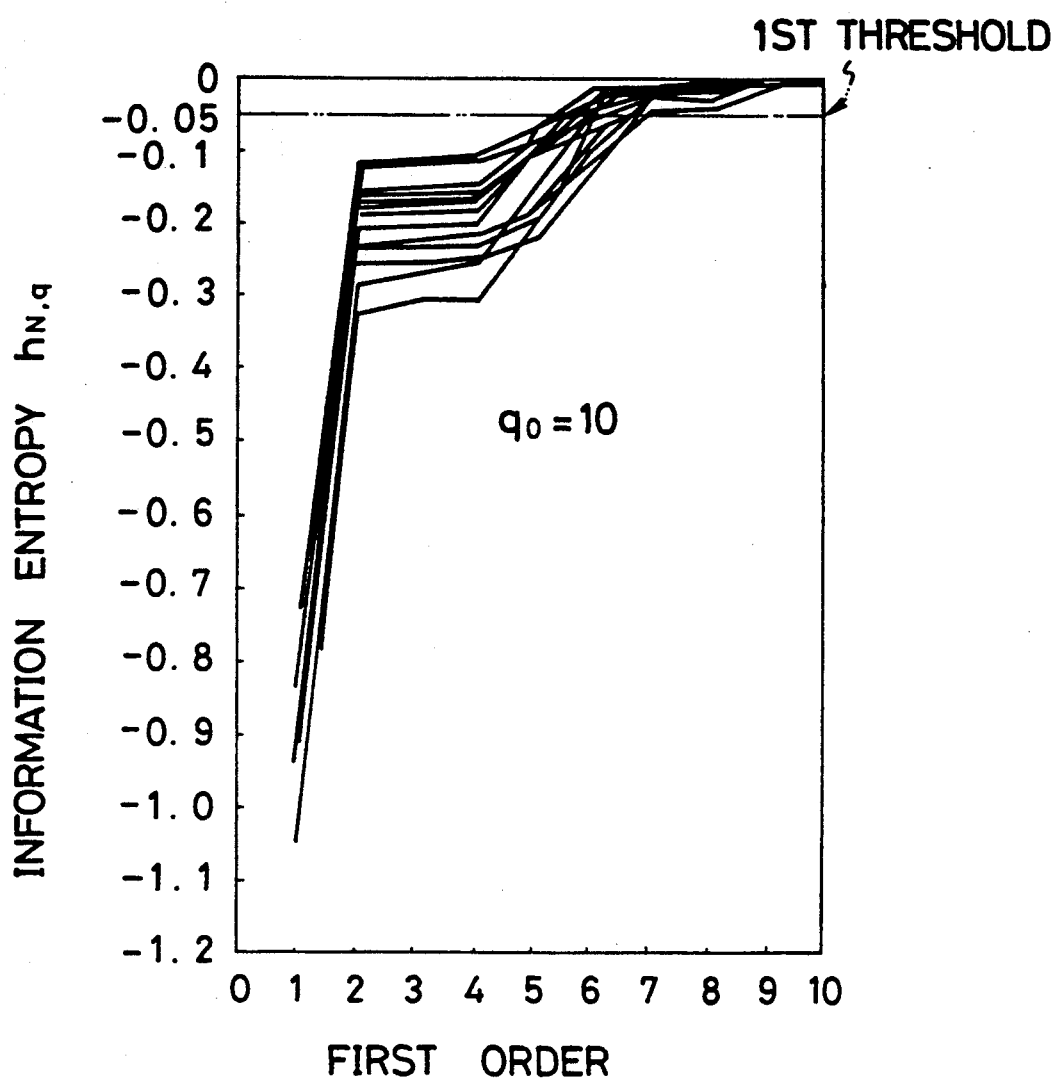
FIG. 4 illustrates determination of the first order.

FIG. 4 illustrates the determination of the optimum first order $\bar{p}$ in a number of different frames of an input signal of the same type as in FIG. 3. The first order p is shown on the horizontal axis, and the information entropy value $h_{N,q}$ on the vertical axis. The second order q is the fixed whitening order $q_0 = 10$ selected in FIG. 3. The first threshold is $-0.05$, a value set on the basis of empirical data such as the data in FIG. 4. For the frames shown, the optimum first order $\bar{p}$ lies in the vicinity of six.

Figure 5:
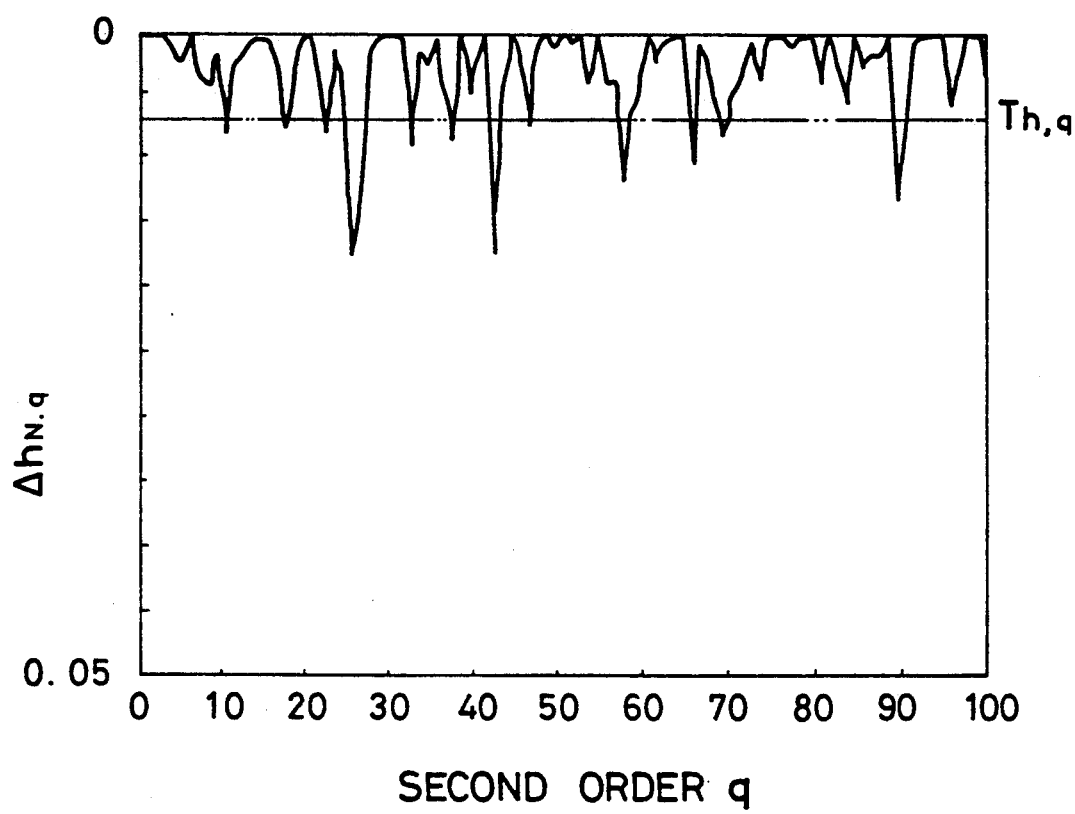
FIG. 5 illustrates determination of the second order.

FIG. 5 illustrates the selection of optimum second orders $\bar{p}$ for a single frame. The second order q is shown on the horizontal axis, and the information entropy change $\Delta h_{N,q}$ on the vertical axis. For the data in this frame, the mean value $\overline{\Delta h_{N,q}}$ is $-3.22 \times 10^{-3}$ and the standard deviation $\sigma_{h,q}$ is $3.91 \times 10^{-3}$, so the second threshold is $-7.13 \times 10^{-3}$. The information entropy change $\Delta h_{N,q}$ exceeds the second threshold at $q = 10$, $q = 17$, and other values of q, which are output as optimum orders $\bar{q}$. Thus $\bar{q} = \{10, 17, \ldots\}$.

Figure 6A:
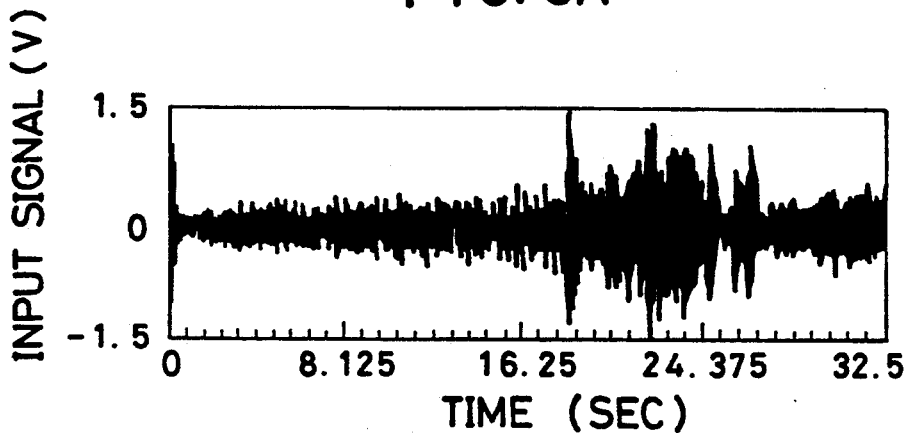
FIGS. 6A-6C shows an example of features extracted by the invention.
Figure 6B:
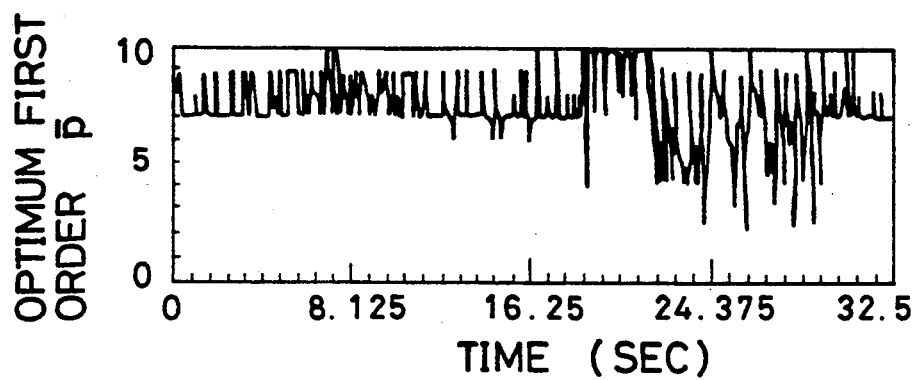
Figure 6C:
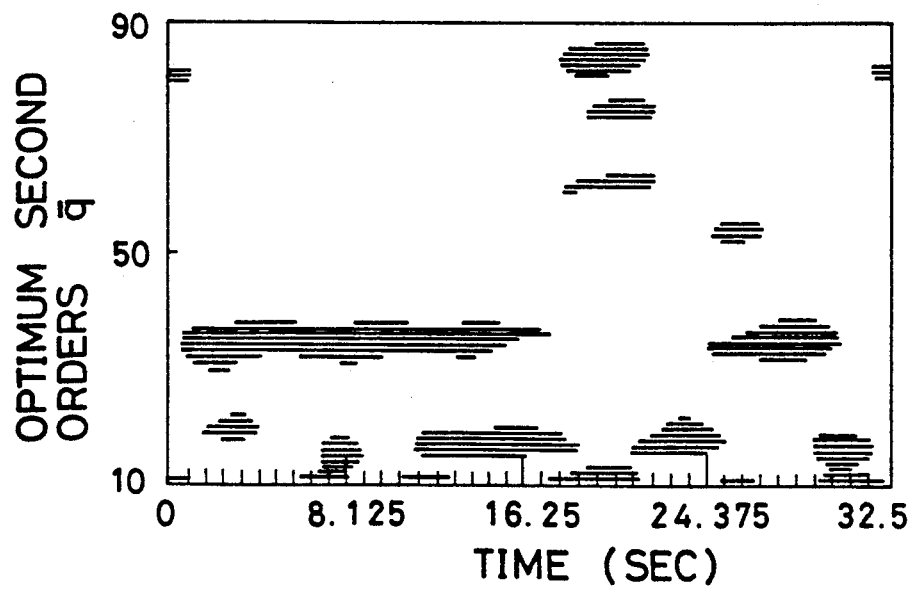

FIGS. 6A, 6B, and 6C illustrate features extracted from an input signal comprising a large number of frames. Time in seconds is indicated on the horizontal axis of all three drawings. FIG. 6A shows the input signal, the signal voltage being indicated on the vertical axis. FIG. 6B illustrates the optimum first order $\bar{p}$ as a function of time. FIG. 6C illustrates the optimum second orders $\bar{q}$ as a function of time. Changes in $\bar{p}$ and $\bar{q}$ can be seen to correspond to transient changes in the input signal. The values of $\bar{q}$ tend to cluster in groups representing, for example, signal components ascribable to different sources. If the input signal is an engine noise signal, different $\bar{q}$ groups might characterize sounds produced by different parts of the engine.

An advantage of the novel feature extraction method is its use of information entropy values to determine the optimum orders. The information entropy value provides a precise measure of the goodness of fit of a linear predictive model of a given order.

Another advantage is that the information entropy values are normalized according to the zero-order residual power. The extracted features therefore reflect the frequency structure of the input signal, rather than the signal level.

Yet another advantage is that the novel method is based on changes in the information entropy. This enables correct features to be extracted regardless of whether the input signal is stationary or nonstationary.

Still another advantage is that the novel feature extraction method provides multiple-order characterization of the input signal. The first-order feature $\bar{p}$ provides information about transmission path characteristics, such as vocal-tract characteristics in the case of a voice input signal. The second-order features $\bar{q}$ provide information about, for example, the fundamental and harmonic frequency characteristics of the signal source. In one contemplated application, the first-order and second-order information are combined into a pattern and used to identify the signal source: for example, to identify different types of vehicles by their engine sounds.

The feature extractor of this invention can be used in many different applications, including speech recognition, speaker identification, speaker verification, and identification of nonhuman sources (for example, diagnosis of engine or machinery problems by identifying the malfunctioning part). To this end, the feature extractor of the invention can be incorporated into a system as shown in the block diagram of FIG. 7. The system, shown generally at 30, comprises a microphone 31 for picking up sound and converting it into electrical signals, as is known in the art. The electrical signals developed at the microphone 31 are delivered to a preprocessor 32 which processes the electrical signals into a form suitable for further processing. In this embodiment of the invention, the preprocessor 32 includes means for pre-emphasis of the signal and means for noise reduction, as are generally well known in the art.

After the electrical signals have been preprocessed in the preprocessor 32, the signals are delivered to a feature extractor 33 built according to the detailed description given above. The feature extractor 33 of this invention will extract the features of the electrical signals which represent the sound detected by the microphone 31.

The features developed by the feature extractor 33 are delivered to a pattern matching unit 34 which compares features from the feature extractor 33 to a reference pattern. The reference pattern is delivered to the pattern matching unit by a reference pattern library or dictionary 35. The reference pattern library 35 is used for storing reference patterns which correspond to features of standard sounds, words, etc., depending upon the particular application. The pattern matching unit 34 decides which reference pattern matches the extracted feature 33 most closely and produces a decision result 36 of that matching process.

The feature extractor, the reference pattern library and the pattern matching unit are generally in the form of a digital signal processing circuit with memory, and can be implemented by dedicated hardware or a program running on a general purpose computer or a combination of both.

The scope of this invention is not restricted to the embodiment described above, but includes many modifications and variations which will be apparent to one skilled in the art. For example, the algorithms used to carry out the linear predictive analyses can be altered in various ways, and different stages can be partly combined to eliminate redundant parts. In the extreme case, all stages can be telescoped into a single stage which recycles its own residuals as input.

What is claimed is:

1. A method of extracting features from an acoustic signal, comprising the steps of:
   detecting a time-varying acoustic signal to be analyzed and developing an electrical signal representative thereof;
   sampling said electrical signal and obtaining therefrom a series of sample values representative of the acoustic signal;
   performing, in an electronic apparatus, first linear predictive analyses of different first orders p on said sample values, thereby generating first residual values;
   performing, in said electronic apparatus, second linear predictive analyses of different second orders q on said first residual values, thereby generating for each second order q a respective information entropy value;
   determining, in said electronic apparatus, a first on of said orders p at which one of said information entropy values satisfies a first threshold;
   outputting, from said electronic apparatus, said determined first one of said orders p as one extracted feature;
   determining, in said electronic apparatus, values of said second orders q at which said information entropy values change by an amount satisfying a second threshold; and
   outputting, from said electronic apparatus, the determined values of said second order q as another extracted feature.

2. The feature extraction method of claim 1, wherein said step of performing second linear predictive analyses generates second residual values.

3. The method of claim 2 further comprising the step of performing third linear predictive analyses, using said second residual values as inputs therefor and obtaining a third order r as a third feature.

4. The method of claim 1 wherein said step of developing a representative electrical signal includes developing an analog electrical signal from said detecting a time-varying acoustic signal step.

5. The method according to claim 4 wherein said step of performing first linear predictive analyses includes receiving said series of sample values at a first linear predictive analysis circuit and at a first residual filter circuit coupled to the first linear predictive analysis circuit.

6. The method according to claim 5 wherein said step of performing first linear predictive analyses includes applying said information entropy values to a whiteness evaluator circuit and to a first order decision circuit coupled to said whiteness evaluator circuit.

7. The method of claim 4 wherein said step of performing second linear predictive analyses includes applying said first residual values to a second linear predictive analysis circuit.

8. The method according to claim 7 wherein said second linear predictive analysis circuit generates a residual power from said first residual values.

9. The method according to claim 8 wherein said step of performing second linear predictive analysis includes applying said residual power to an entropy calculator wherein said entropy calculator generates a plurality of information entropy values from said residual power.

10. The method according to claim 9 wherein said step of performing second linear predictive analysis includes applying said information entropy values to a second order decision circuit coupled to the second linear predictive analysis circuit.

11. The method of claim 1 wherein said step of performing said first linear predictive analysis includes:
    applying said information entropy values to a whiteness evaluator circuit and a first order decision circuit;
    said whiteness evaluator circuit generating a whitening order from said entropy values;
    applying said whitening order to said first order decision circuit, said first order decision circuit outputting a first order p signal based upon said whitening order and said entropy values;
    applying said first order p signal to a first linear predictive analysis circuit, said first linear predictive analysis circuit also receiving said sample values and generating first linear predictive coefficients from said sample values and said first order p; and
    applying said first linear predictive coefficients and said sample values to a first residual filter circuit which generates said first residual values.

12. The method of claim 11 wherein said step of performing said first linear predictive analysis includes:

determining, in said whiteness evaluator circuit, the whitening order beyond which said information entropy values decrease at a substantially constant rate;

applying said whitening order to said first order decision circuit;

determining, in said first order decision circuit, whether one of said information entropy values corresponding to said whitening order does not satisfy said first threshold, incrementing said first order p, then repeating said operation of said first linear predictive analysis circuit; and determining, in said first decision circuit, whether one of said information entropy values corresponding to said whitening order satisfies said first threshold, outputting one of said first orders p corresponding to said determined one of said information entropy values and said second orders q corresponding to said information entropy values that satisfy a second threshold.

13. The method of claim 1 wherein said step of performing second linear predictive analysis includes:

applying said first residual values to one linear predictive analysis circuit;

generating a residual power representative of an error in the first linear predictive analysis step;

applying said residual power to an entropy calculator circuit;

generating from said residual power an information entropy value;

applying said entropy value to a second order decision circuit and to another linear predictive analysis circuit;

generating from said information entropy value a second order q;

applying said second order q to said another linear predictive analysis circuit and to an output.

14. The method of claim 13 including generating in said one linear predictive analysis circuit a second linear predictive coefficient; and applying said first residual values and said second linear predictive coefficients to a residual filter wherein said residual filter generates second residual values.

15. The method of claim 1 further including applying said first orders p and said second orders q from said analysis circuit to a pattern matching unit and identifying the acoustic signal using said first and second orders p and q.

16. The method of claim 15 wherein said step of identifying said acoustic signal includes obtaining a reference pattern from a reference pattern library circuit and communicating it to said pattern matching unit.

17. The method according to claim 1 wherein said method is performed in a set of first and second linear predictive analysis stages, said sampling step including applying said series of sample values to a first stage linear predictive analysis circuit;

said step of performing first linear predictive analysis including applying said residual values to a second stage linear predictive analysis circuit;

said second stage linear predictive analysis circuit applying said entropy value to said first stage linear predictive analysis circuit;

said outputting step comprising outputting said first order p from the first stage linear predictive analysis circuit, and outputting said second order values q from said second stage linear predictive analysis circuit.

18. The method of claim 17 wherein said step of determining a first one of said order p includes applying said information entropy values to a first order decision circuit and to a whitening order circuit coupled to said first order decision circuit.

19. The method of claim 18 wherein said step of determining a plurality of values of said second orders q includes applying said information entropy values to a second order decision circuit.

20. The method of claim 1 further comprising the steps of:

generating in a first linear predictive analysis circuit first linear predictive coefficient from said sample values and said first orders p;

generating in a residual filter said residuals from said sample values and said first orders p;

generating in a second linear predictive analysis circuit a residual power from said residuals;

generating in an entropy generator from said residual power said information entropy value for each of said second orders q;

inputting and storing said entropy values in a whiteness evaluator to generate whitening order responsive to said entropy values decreasing at a substantially constant rate;

inputting to a first order decision circuit said information entropy values and said whitening order to calculate said first one of said first orders p at which one of the said entropy values exceeds that first threshold; and inputting and storing to said second order decision circuit said entropy values to calculate values of said second orders q of which said entropy values change by amount exceeding said second threshold.

21. The method of claim 20 wherein said input signal comprises an audio signal and said method is part of a sound recognition system.

22. In a method of acoustic signal analysis, a method of extracting features from a time-varying acoustic signal, comprising the steps of:

receiving a time-varying acoustic and developing an electrical input signal representative thereof;

sampling said electrical input signal, thereby obtaining a series of sample values therefrom;

initializing a first order p to an initial value;

carrying out, in an electronic apparatus, a first linear predictive analysis of said first order p on said sample values, thereby generating a series of first residual values;

carrying out, in electronic apparatus, a plurality of second linear predictive analyses of different second orders q on said series of first residual values, thereby generating a corresponding plurality of information entropy values;

finding, in electronic apparatus, a whitening order $q_o$ beyond which said information entropy values decrease at a substantially constant rate;

deciding, in electronic apparatus, whether the information entropy value corresponding to said whitening order $q_o$ satisfies a first threshold;

if the information entropy value corresponding to said whitening order $q_o$ does not satisfy said first threshold, then incrementing said first order p and repeating said first linear predictive analysis and subsequent steps; and if the information entropy value corresponding to said whitening order $q_o$ does satisfy said first threshold, outputting as features said first order p and said second orders q corresponding to said information entropy values that satisfy a second threshold.

23. The feature extraction method of claim 22, wherein said step of performing second linear predictive analyses generates second residual values.

24. The feature extraction method of claim 22, also comprising the steps of:
computing a plurality of changes of said information entropy values;
computing a mean of said changes in said information entropy values;
computing a standard deviation of said changes in said information entropy values; and
generating said second threshold by subtracting said standard deviation from said mean.

25. A method for analyzing a time-varying acoustic signal by extracting features therefrom and comparing the extracted features to known or expected features, comprising the steps of:
sensing a time-varying acoustic signal and developing an electrical input signal representative thereof;
sampling said electrical input signal, thereby obtaining a series of sample values therefrom;
initializing a first order p to an initial value;
carrying out, in an electronic apparatus, a first linear predictive analysis of said first order p by finding a set of p linear predictive coefficients $a_1, \ldots, a_p$, calculating a plurality of predicted sample values from said linear predictive coefficients and the preceding p sample values, and subtracting the sample values to generate a series of first residual values;
carrying out, in an electronic apparatus, a plurality of second linear predictive analyses of different second orders q on said series of first residual values by calculating residual powers $\sigma_q^2$ and normalizing said residual powers $\sigma_q^2$ according to a zero-order residual power $\sigma_o^2$, thereby generating a corresponding plurality of information entropy values;
mutually comparing, in an electronic apparatus, said information entropy values and finding a whitening order $q_o$ beyond which said information entropy values decrease at a substantially constant rate;
deciding, in an electronic apparatus, whether the information entropy value corresponding to said whitening order $q_o$ satisfies a first threshold;
if the information entropy value corresponding to said whitening order $q_o$ does not satisfy said first threshold, incrementing said first order P to another value, then repeating said first linear predictive analysis and subsequent steps;
if the information entropy value corresponding to said whitening order $q_o$ does satisfy said first threshold, then outputting as extracted features the current value of said first order p and those values of said second order q at which the difference between the corresponding information entropy value and the preceding information entropy value satisifes a second threshold; and
comparing the extracted features to known or expected features for identifying the acoustic signal.

26. The feature extraction method of claim 25, wherein said whitening order $q_0$ has a fixed value.

27. The feature extraction method of claim 25, wherein said second linear predictive analyses include the steps of iteratively computing average reflection coefficients.

28. The feature extraction method of claim 25, wherein each of said linear predictive analyses of order q comprises steps of:
finding a set of q linear predictive coefficients $b_1, \ldots, b_q$; and
calculating predicted sample values from said linear predictive coefficients and the preceding q residuals, and substracting the residuals to obtain a series of second residual values.

29. The feature extraction method of claim 25, also comprising steps of;
computing a plurality of changes of said information entropy values;
computing a mean of said changes in said information entropy value;
computing a standard deviation of said changes in said information entropy value; and
generating a second threshold by subtracting said standard deviation from said mean.

30. The feature extraction method of claim 25, wherein said first threshold is substantially 0.05.

31. The feature extraction method of claim 25, wherein said second linear predictive analyses are performed with second orders q ranging from 1 to substantially 100 in unit increments.

32. A method of extracting features from an input signal for data evaluation comprising the steps of:
coupling a first linear predictive analysis circuit together with a second linear predictive analysis circuit;
the first linear predictive analysis circuit including a residual filter, a linear predictive analyzer, a first order decision circuit, and a whiteness evaluator;
the second linear predictive analysis circuit including a linear predictive analyzer, a second order decision circuit, an entropy calculator;
receiving input signals at a sampling circuit and developing a series of sample values;
applying said sample values to said first linear predictive analysis circuit, including applying said sample values to said first linear predictive analyzer and said first residual filter;
said first linear predictive analyzer generating linear predictive coefficients and applying said linear predictive coefficients to said first linear residual filter;
said first residual filter generating residual values and applying said residual values to said second linear predictive analyzer;
said second linear predictive analyzer generating second coefficients and generating a residual power signal and coupling said residual power signal to said entropy calculator;
said entropy calculator generating information entropy values and applying them to said second order decision circuit;
said second order decision circuit generating second order q values and applying said q values to said second linear predictive analyzer;
said first linear predictive analysis circuit receiving values from said entropy value calculator and from said whiteness evaluator and generating first order values p;
outputting said first order values p, said second order values q, and entropy values from said residual filters.

33. The method of claim 32, said second linear predictive analyzer generating second linear predictive coefficients and applying said second linear predictive coefficients to a second residual filter;

said second residual filter generating said second residual values and outputting said second residual values to a further linear predictive analysis circuit.

34. A pattern recognition method comprising the steps of:

electronically sampling an input signal containing a pattern to be recognized to obtain a data series of sample values;

performing, in a linear analysis circuit, first linear predictive analyses of different first orders p on said sample values, thereby generating first residual signals;

performing, in said analysis circuit, second linear predictive analyses of different second orders q on said first residual signals, thereby generating for each second order q an information entropy value;

determining, in said analysis circuit, a first one of said orders p at which one of said information entropy values exceeds a first threshold;

outputting, from said analysis circuit, said determined first one of said orders p;

determining, in said analysis circuit, values of said second orders q at which said information entropy values change by an amount exceeding a second threshold;

outputting, from said analysis circuit, the determined values of said second order q;

comparing said first one of said orders p and said plurality of said second orders q to a reference pattern supplied by a reference pattern library; and generating in response to said comparison an output indicating the identity of said pattern.

35. The method of claim 34 wherein said step of sampling an input signal includes receiving an audio signal, converting it to an analog signal, and sampling the analog signal.

36. A machine-implemented method for extracting features from a time varying signal, comprising the steps of:

receiving an input signal representative of the time-varying signal;

sampling said input signal to obtain a series of sample values;

applying the series of sample values to a first stage circuit;

in the first stage circuit, generating and outputting a first output signal and generating first residual signals e(p,n);

providing said first residual signals to a second stage circuit;

in the second stage circuit, generating and outputting a second output signal and generating second residual signals e(q,n) and entropy signals h, based on the first residual signals;

providing said entropy signals to said first stage circuit;

the operation of said first stage circuit including:

(a) applying said series of sample values to a first linear predictive analyzer (LPA) and performing first linear predictive analysis thereat of different orders, the first LPA generating signals "a" and providing them to a first residual filter;

(b) applying said series of sample values to the first residual filter and generating thereat said first residual signals e(p,n);

(c) applying said entropy signals from the second stage circuit to a whitening evaluation circuit and determining thereat a whitening order q indicative of a characteristic of the entropy signals from the second stage circuit; and (d) in a first order decision circuit, making first order decisions based on the whitening order q, incrementing said first orders p, and determining whether an information entropy value corresponding to said whitening order exceeds a first threshold, the first order decision circuit providing order p signals to said first LPA, the first order decision circuit being configured to output as a first feature a signal indicative of the first order at which the first threshold is passed;

the operation of the second stage circuit including:

(a) receiving and applying said first residual signals to a second linear predictive analyzer (LPA) and a second residual filter, the second LPA (i) performing second linear predictive analysis thereat of different orders q, (ii) and generating and providing residual signals "b" to said second residual filter, and (iii) generating an error signal representative of an error in the second linear predictive analysis;

(b) at said second residual filter, generating said second signals e(q,n);

(c) applying said error signals from the second stage LPA to an entropy calculator and determining thereat an entropy signal h indicative of a characteristic of the error signals from the second stage LPA; and (d) in a second order decision circuit, making second order decisions based on the entropy signal h, incrementing said second orders q, and determining whether an information entropy value corresponding to said whitening order exceeds a second threshold, the second order decision circuit providing second order q signals to said second LPA, the second order decision circuit outputting as a second feature a signal indicative of the first order at which the second threshold is passed.

37. The method of claim 36 further including applying entropy signals from the entropy calculator to said first order decision circuit.

38. The method of claim 37 further comprising coupling a third stage circuit to receive said second residual signals e(q,n) and determining and providing entropy signals to said entropy calculator of said second stage circuit, and providing a third feature r as an output.

39. The method of claim 36 wherein said time-varying signal comprises an acoustic signal; and wherein said step of receiving an input signal includes receiving an analog signal generated from said acoustic signal;

the method further comprising the steps of comparing the extracted features to known or expected features and thereby determining the correspondence between the signal or parts thereof to known or expected features, and identifying the acoustic signal on the basis of said correspondence.

* * * * *